(12) United States Patent
LaRocco (10) Patent No.: US 11,001,314 B2
(45) Date of Patent: May 11, 2021

(54) FOAM REEFER WALL BACKING WITH HOOK STRIP/SHAPE ADDITIONS AND RELATED METHOD

(71) Applicant: Michael C. LaRocco, Sewickley, PA (US)

(72) Inventor: Michael C. LaRocco, Sewickley, PA (US)

(*) Notice: Subject to any disclaimer, the term of this patent is extended or adjusted under 35 U.S.C. 154(b) by 127 days.

(21) Appl. No.: 16/017,955

(22) Filed: Jun. 25, 2018

(65) Prior Publication Data
US 2018/0370579 A1 Dec. 27, 2018

Related U.S. Application Data

(63) Continuation-in-part of application No. 15/475,486, filed on Mar. 31, 2017, now Pat. No. 10,821,701.

(60) Provisional application No. 62/523,833, filed on Jun. 23, 2017.

(51) Int. Cl.
| | | |
|---|---|---|
| *B32B 5/02* | (2006.01) | |
| *B62D 33/04* | (2006.01) | |
| *B61D 3/00* | (2006.01) | |
| *B32B 1/02* | (2006.01) | |
| *B32B 5/06* | (2006.01) | |
| *B32B 7/12* | (2006.01) | |
| *B32B 7/14* | (2006.01) | |
| *B61D 17/00* | (2006.01) | |
| *B62D 29/04* | (2006.01) | |
| *B65D 88/12* | (2006.01) | |
| *F16L 59/02* | (2006.01) | |
| *B32B 7/08* | (2019.01) | |
| *B32B 17/04* | (2006.01) | |
| *B32B 17/06* | (2006.01) | |
| *B32B 5/24* | (2006.01) | |

(52) U.S. Cl.
CPC .............. *B62D 33/048* (2013.01); *B32B 1/02* (2013.01); *B32B 5/02* (2013.01); *B32B 5/024* (2013.01); *B32B 5/06* (2013.01); *B32B 7/12* (2013.01); *B32B 7/14* (2013.01); *B61D 3/00* (2013.01); *B61D 17/005* (2013.01); *B62D 29/043* (2013.01); *B65D 88/12* (2013.01); *B32B 5/245* (2013.01); *B32B 7/08* (2013.01); *B32B 17/04* (2013.01); *B32B 17/066* (2013.01); *B32B 2307/304* (2013.01); *B32B 2605/00* (2013.01); *F16L 59/028* (2013.01)

(58) Field of Classification Search
CPC .... B32B 1/02; B32B 5/06; B32B 7/08; B32B 7/12; B32B 7/14; B32B 5/02; B32B 5/024; B62D 33/048; B62D 29/043; B61D 3/00; B61D 17/005; B65D 88/12; B65D 90/022
See application file for complete search history.

*Primary Examiner* — Walter Aughenbaugh
(74) *Attorney, Agent, or Firm* — Gary P. Topolosky (57) ABSTRACT

An improved reefer wall panel having better foam adhesion by including a plurality of hook and loop tape sections. The sections, as strips, may be applied horizontally or diagonally and may extend from the top to near the bottom of any such wall panel before foaming. They may be applied to the whole of panel, randomly throughout or to just the more vulnerable lower sections of a given panel.

10 Claims, 11 Drawing Sheets

FOAM REEFER WALL BACKING WITH HOOK STRIP/SHAPE ADDITIONS AND RELATED METHOD

CROSS-REFERENCE TO RELATED APPLICATIONS

This is a perfection of U.S. Provisional Application Ser. No. 62/523,833, filed on Jun. 23, 2017, and a continuation-in-part of U.S. application Ser. No. 15/475,486, filed on Mar. 31, 2017, both disclosures of which are fully incorporated by reference herein.

BACKGROUND OF THE INVENTION

Applicant has used a polyester point bond fabric backing called "scrim" on his glass reinforced thermoplastic panels (GRTP) for interior walls of refrigerated trailers, railcars, shipping containers, box trucks, and general refrigeration (or "reefer") storage units since 1998. The idea was originally developed to get good bonding during manufacture of the reefer units. It was intended for the insulating foam poured between the cavity of the inner wall (GRTP) and outer wall (metal skin) to better adhere to the latter. The foam soaks into and bonds to the polyester point bond "scrim" backing. Applicant was granted a patent (U.S. Pat. No. 6,743,742) for his original system. Although the idea was novel and relevant, it was later found to be too broad encompassing "any" panel rather than just panels used for the interiors of refrigerated trailers, truck bodies, container, and rail cars.

Since then, and consequently, the original "scrim" concept was adopted as a standard practice and has been used by many competitors in the truck trailer business that also supplies panels for refrigerated applications. Additionally, various methods to enhance this bond have been limited in their success. For example, lofting the scrim (creating a brush to break surface fibers loose to create better bonding) or using other materials/films to help chemically bond foam to panel do not inherently increase the bonding capability of the scrim surface. Applicant now believes he has a significant improvement to that earlier design.

The goal is to produce a panel with a unique and varied method of bonding to the foam for the reasons set forth herein. Fork trucks and other freight loading mechanisms create tremendous pressure and damage to the inside of a refrigerated unit resulting pressure against the wall as cargo gets stacked in such units. In these cases, the pressure causes bond of "scrim" to foam to separate because the wall's inability to hold onto the foam (grab factor) is less than the pressure exerted. The result is wall delamination from the foam structure and a wall that now is compromised. Since units useful life is up to fifteen years, the separation of the foam to the wall is critical in the longevity of the unit. The scrim helps to grab the foam but methods to scrape or loft scrim, use of films, and other methods of bonding foam have not eliminated the problem. When the wall delaminates from the foam, it allows moisture to infiltrate, resulting in potential damage and ultimate costly repair or replacement of the interior wall.

One known process gets scrim to stick to the back of material comprised of a glass-reinforced polypropylene tape that is layered and then laminated into each panel. That lamination process melts, compresses, and then cools product in a continuous process. The scrim is a "fiberized PET point bond" fabric with a higher melting point than the polypropylene so when it is laid atop of applicant's product and run through the lamination process, it does not melt along with the whole structure. Rather, it absorbs the polypropylene during the melting process. Applicant has now developed a way for his applied polypropylene to NOT absorb all the way through. As such, when his product gets foamed, the backside will allow the "foam soak bond".

Other Relevant Art

In chronological order, they include:

Lowthian U.S. Pat. No. 3,934,064 disclosed a composite structure of knitted glass fabric and thermoplastic polyfluoroethylene resin sheet. FIG. 4 therein showed, in an enlargement, a single loop of yarn (from knitted glass fabric) containing a monofilament of a "melt-fabricable perhalopolyfluoroethylene" polymer resin. The composite structure incorporating that fabric was claimed to have corresponding extensibility.

Adams U.S. Pat. No. 4,474,635 disclosed a cushioned panel and a related method of molding it. For the panel, a non-woven fabric with an outer layer of polypropylene or other thermoplastic was heated to the melting point of the fibers before being inserted into a mold with a decorative surface fabric and piece of foam cushioning. The mold was designed so that edges of the male and female mold halves compress for forcing the molten surface of that substrate into interstices of the surface fabric.

Ott et al. U.S. Pat. No. 4,761,318 disclosed a disposable diaper that employed a soft flexible sheet-like fibrous structure with a multiplicity of loops along a first surface, and a layer of thermoplastic resin adhered to a second major surface for anchoring those loops in the fibrous structure. It has no equivalence whatsoever to trailer/container walls.

Novak U.S. Pat. No. 6,863,970 disclosed a product consisting of polyethylene and polypropylene with at least one sheet of fibrous material that enabled bonding of the polyolefin to a non-polyolefin foam. The combination also preferably included a fastener having threaded portions positioned within the foam which threaded portions are not easily removed when an outward force is applied.

Hedley et al Published U.S. Application No. 20100040839 disclosed a method and apparatus for making an embossed thermoplastic liner panel for the interior of a cargo transporter/trailer. The invention inserted a release film between its reinforced polymer feedstock and an impression mat.

Erickson et al. Published U.S. Application No. 20130025766 disclosed a loop fastener material finished by applying foam to a surface of the fabric, that foam containing both a liquid binder and a powder. That binder was allowed to flow into pores of the fabric and coat fiber interstices as the foam collapses. Then, it was dried to stabilize the fabric. The particle size of that powder was selected to cause most of it to remain on the fabric surface while the binder is dried. That fabric surface, with powder bonded thereto, was then activated by heat, RF or UV energy for adhering to yet another surface.

Finally, Lookebill et al. Published U.S. Application No. 20150246511 disclosed a thermal insulated composite wall panel for insulated trailers. The panel included a first liner panel, second liner panel with a layer of fibers and at least one structural polymer resin layer disposed coplanar to and bonded with the fibers layer.

SUMMARY OF THE INVENTION

The products of the parent invention employ an improved "looped" fabric backing for the manufacture of glass-reinforced thermoplastic panels, said loop fabric backing exhibiting a several fold increase (or a 100%, 150% or as much as a 200% greater foam adhesion) than its point bond scrim counterpart. Another product in the parent filing is the improved glass-reinforced thermoplastic interior wall panel that is made using the aforementioned loop fabric backing. Yet a third improved product therein is a storage unit, such as a refrigerated trailer, railcar, shipping container and/or box truck having interior wall panels foam adhered to this new and improved loop fabric backing. The latter product would be more damage resistant than its earlier scrim counterparts.

A method for making such improved products starts with (a) providing an improved "loop" fabric backing substrate; (b) providing a single or multiple 0/90, 0/45 tape, or a woven glass reinforced polymer layer (preferably, polypropylene); (c) providing a surface film made of lightweight scrim coated with polypropylene and having a PET-integrated release liner; (d) combining elements (a) through (c) and feeding them into a continuous flatbed laminator or similar lamination line for heating and pressing; then (e) cooling the product exiting the laminator to make a glass-reinforced thermoplastic interior wall panel therefrom.

A further novel method of the parent invention entails making an improved storage unit, such as a refrigerated trailer, railcar, shipping container and/or box truck with a plurality of the aforementioned glass-reinforced thermoplastic interior wall panels. That unit will exhibit greater adhesion inside of its interior wall panels, resulting in less potential downtime and loss of thermal efficiency from damage from container packers and/or during packaging transport. Due to increased foam adhesion, such units will have reduced repair/replacement costs and a prolonged useful life.

For the present invention, i.e., the subject of this case, there is disclosed an improved reefer wall panel having better foam adhesion by including a plurality of hook and loop tape sections. The sections, as strips, may be applied horizontally or diagonally and may extend from the top to near the bottom of any such wall panel before foaming. They may be applied to the whole of panel, randomly throughout or to just the more vulnerable lower sections of a given panel.

BRIEF SUMMARY OF THE DRAWINGS

Further features, objectives and advantages of this invention will become clearer with the following Detailed Description made with reference to the accompanying drawings in which.

DETAILED DESCRIPTION OF PREFERRED EMBODIMENTS

Figure 7:
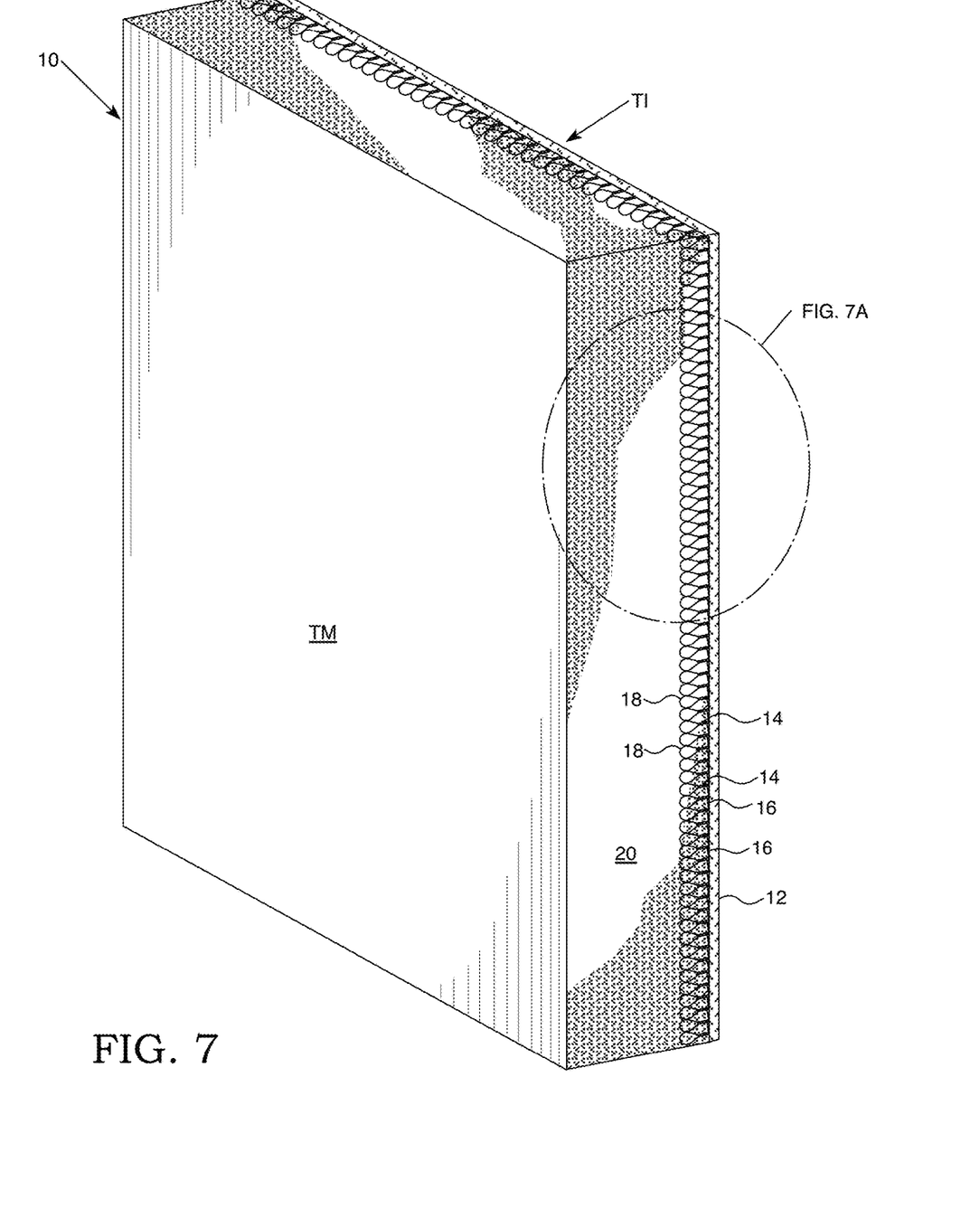
FIG. 7 is a front perspective view showing one system of foam reefer wall according to this invention, said foam reefer wall employing one embodiment of loop scrim fabric backing for improved foam adhesion thereto, all interconnected using one continuous fiber creating base and loop together.
Figure 7A:
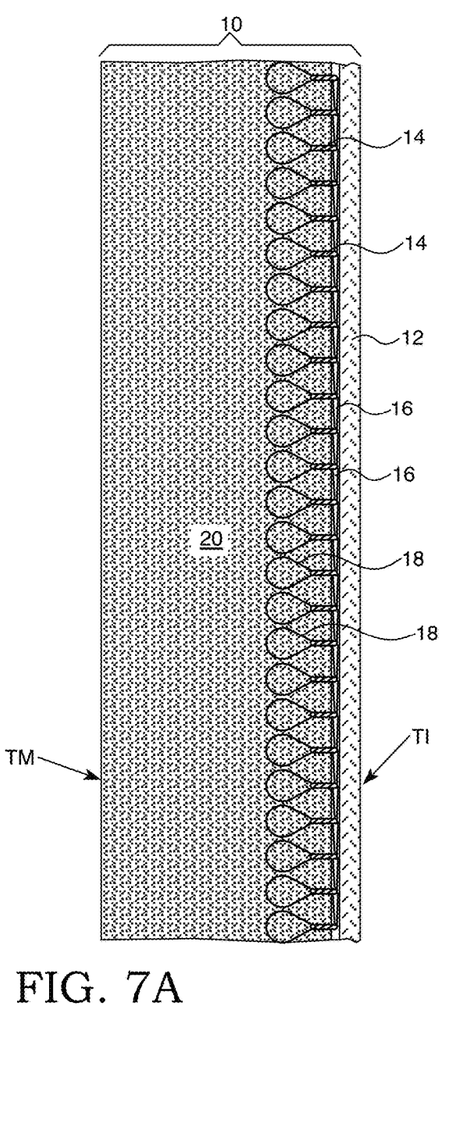
FIG. 7A is a close-up sectional view of the circled area 7A from FIG. 7, showing loops of a substantially uniform or constant height.
Figure 7B:
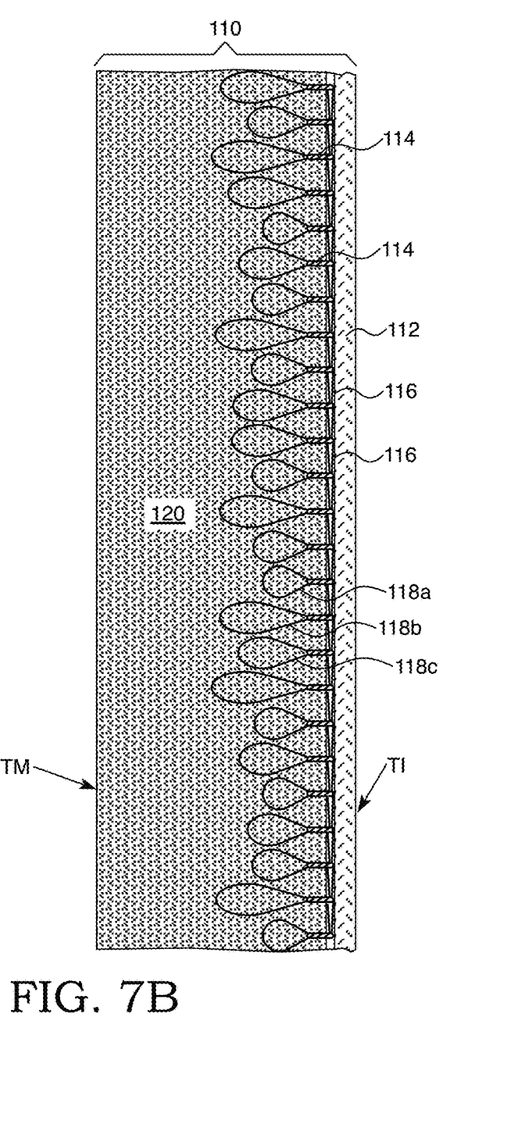
FIG. 7B is a cross-sectional view of a first alternative embodiment showing loops with purposefully variable heights, 118a, 118b and 118c.

When referring to alternate embodiments, like that shown in FIG. 7B, common elements are commonly numbered though in the next hundred series.

When referring to any numerical length, width, percent improvement or other quantitative comparison number (or number range) herein, it should be noted that all such numbers are representative of embodiments of the invention as shown. Furthermore, any such range of numbers should expressly include each and every fraction or decimal between its stated minimum and maximum. For instance, any one component (of loop material) having from about 40 to 70 loops per square inch, should also specifically cover fabric backing substrates having about 41, 42 and 45 loops/$in^2$ . . . and so on, up to about 65, 67 and 69.6 loops/$in^2$. And for loop heights between abut 0.5 to 6 mm or more, preferably about 3 to 5 mm each, those loops would include all values between the aforementioned minimum and maximum loop heights. It is to be understood, however, that Applicant considers the mere aspect of creating such looped scrim fabric backing, regardless of loop size/consistency and/or relative loop density to be a truly novel, game-changer aspect of the present invention.

A fabric backing with at least about 30% greater foam adhesion as compared to its scrim counterpart, would also exhibit about 35, 40 and 50%+ improvement. The same applies for every other quantitative range herein.

Figure 1:
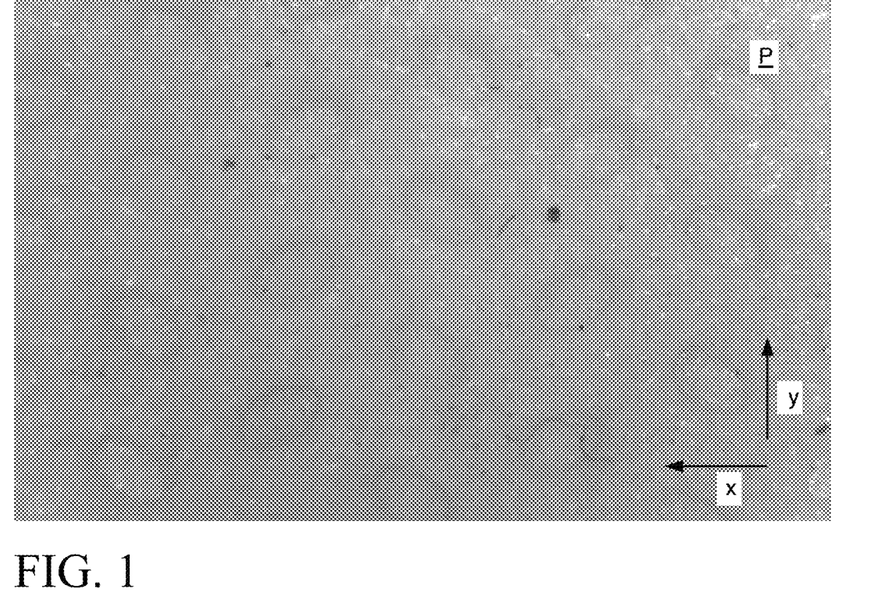
FIG. 1 is a photograph showing currently known scrim with its very small fibers in just the x and y-axes.

FIG. 1 shows a 37× magnification of current "known" standard scrim panel as might be made and sold by Xamax Industries, Matterworks and/or OXCO Industries to name a few. Unfortunately, therein, the underlying panel P had its foam F separated therefrom with the application of nominal pull pressure due to a weakness of adhesion at the interface between as better seen in accompanying FIG. 1A.

Note the following difficulties/disadvantages with that product:

1) fibers are very small—in only the x- and y-Axes (marked therein);
2) there are indentations where the fibers have been connected via a heated "point bond" roller;
3) it is a much denser product—harder to soak into during foaming therefore resulting in worse bonding; and
4) this point bond product is made of two layers bonded together, which could allow separation. It is especially vulnerable to separation especially when moisture is introduced.

Figure 1A:
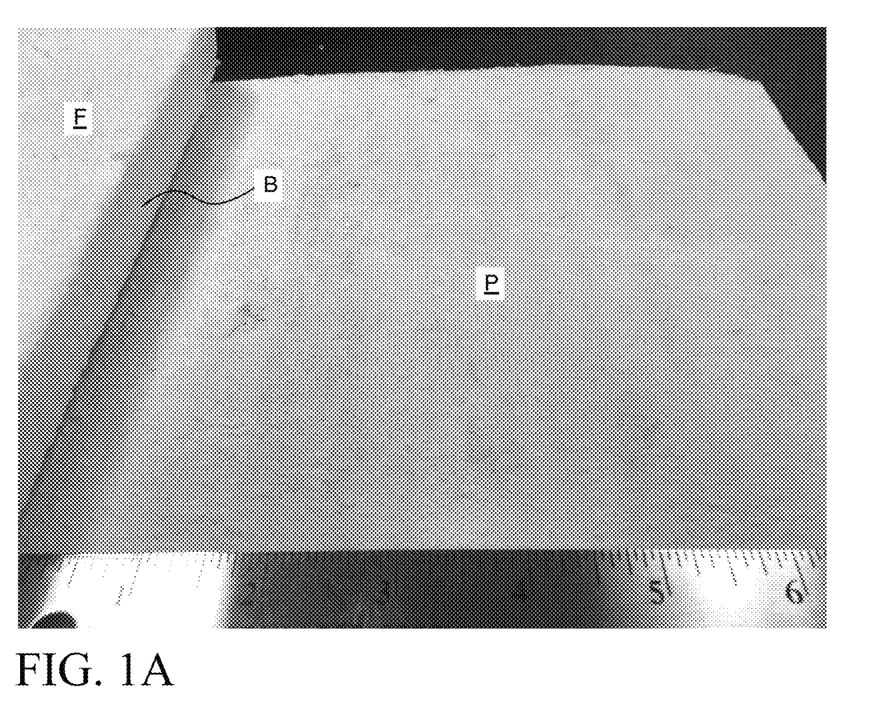
FIG. 1A is a photograph showing the standard scrim bond of FIG. 1 with its attached foam partially peeled away.

FIG. 1A is a photograph showing a prior art panel P with its standard scrim bond B, like that shown in FIG. 1, when attached to foam F but then that latter foam F is partially peeled away.

Accompanying FIGS. 2A through D shows Applicant's newest development. It exhibits much advancement and improvement over the current scrim of FIG. 1. The underlying material has a plurality of loops extending upwardly therefrom before being combined with foam by injection during the manufacture of trailer and other GRTP materials/component parts. The resulting product exhibits much greater adhesion at its interface.

Figure 2A:
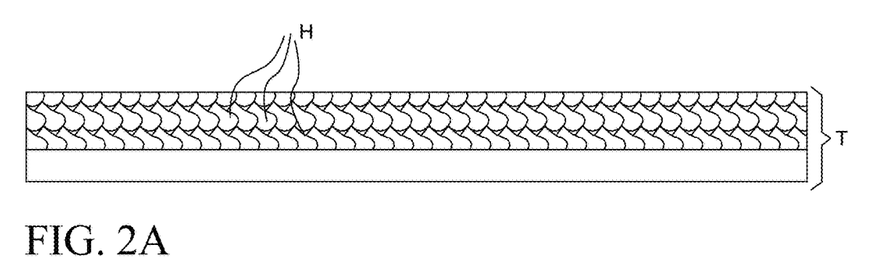
FIG. 2A is a cross sectional view of a lower half hook and loop tape as used with the present invention.
Figure 2B:
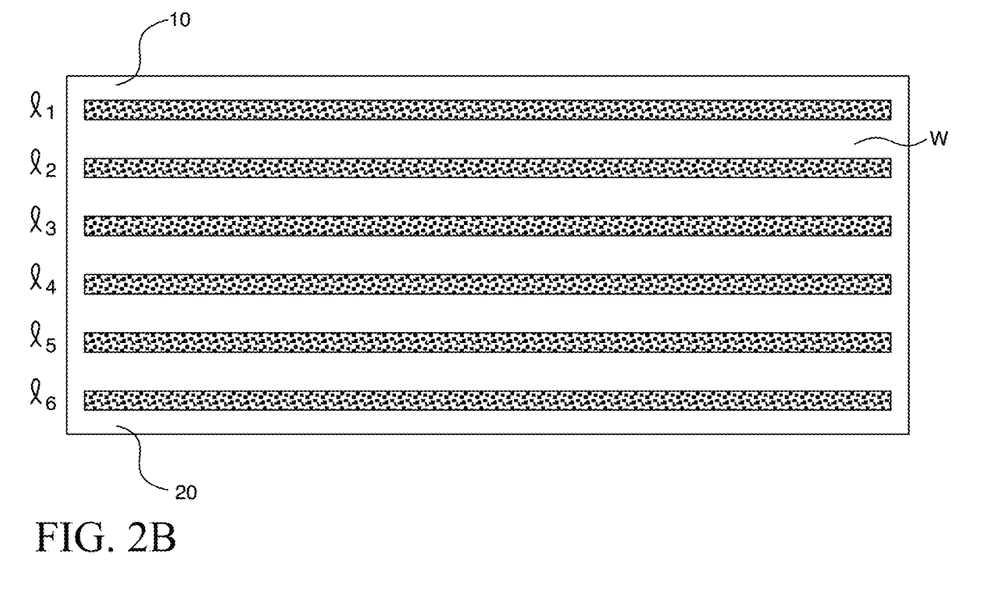
FIG. 2B is a front plan view of a first embodiment of improved reefer wall having a plurality of hook tape sections applied in a spaced, horizontal arrangement from near the top to near the bottom of the wall prior to foaming.
Figure 2C:
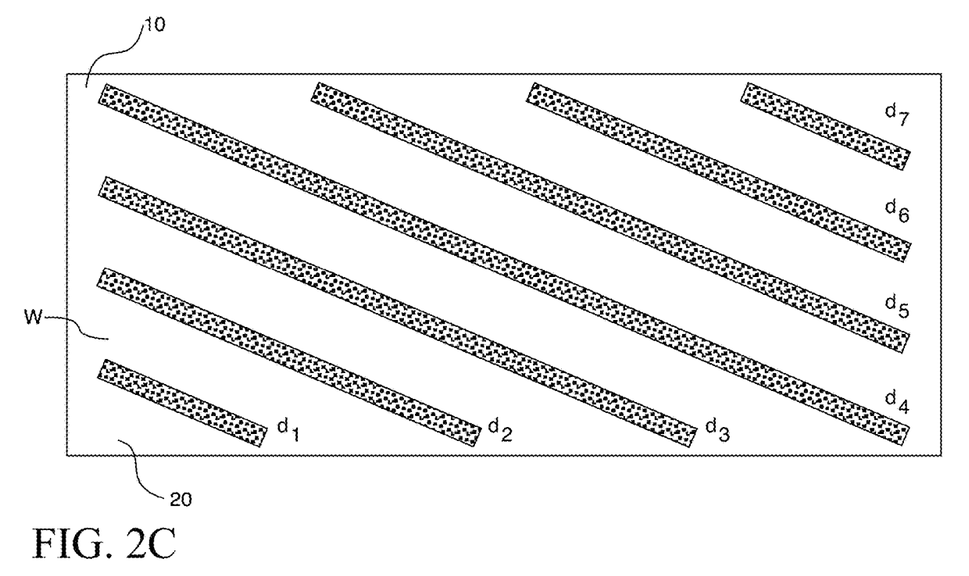
FIG. 2C is a front plan view of a second embodiment of improved reefer wall having a plurality of hook tape sections applied in a spaced, diagonal arrangement from near the top to near the bottom of the wall prior to foaming.
Figure 2D:
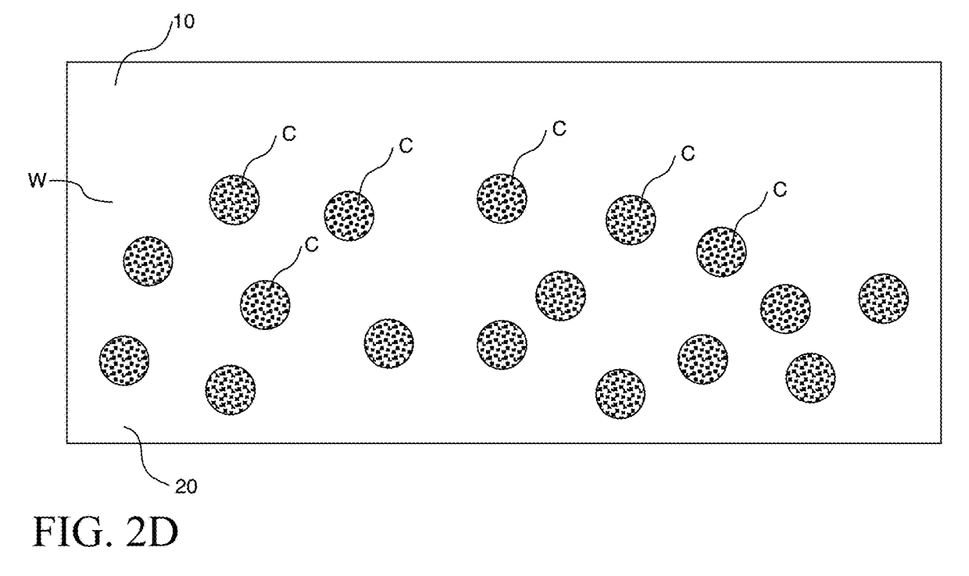
FIG. 2D is a front plan view of a third, representative embodiment of improved reefer wall with a plurality of circular-shaped hook tape sections applied randomly to just a lower section of the wall (in more vulnerable regions for delaminating) prior to foaming.

More particularly, FIG. 2A is a drawing showing a cross section of the 'lower half' of a hook and loop tape T, more often referred to by the name Velcro®, with its barbs or hooks H diagrammatically depicted as extending upwardly and along a section of adhesive tape backing. A second section of looped fabric, not shown in this view, would be layered onto the aforementioned hook components and with nominal applied pressure forced into the hooks for readily interlocking therewith. Such connections are reusable, however, as the upper loops can be pulled away from the hooks and then repeatedly rejoined thereto;

FIG. 2B is a drawing showing a first embodiment of improved reefer wall W with a plurality of lateral hook tape sections ($1_1$ through $1_6$) applied in a spaced, horizontal arrangement from near the top 10 to near the bottom 20 of wall W prior to the application of foam thereto;

FIG. 2C is a drawing showing a second embodiment of improved reefer wall W with a plurality of hook tape sections ($d_1$ through $d_7$) applied in a spaced, diagonal arrangement from left to right, from near the top 10 to near the bottom 20 of wall W prior to the application of foam thereto; and FIG. 2D is a drawing showing a third, representative embodiment of improved reefer wall W with a plurality of circular-shaped hook tape sections c applied randomly to just a lower section 20 of wall W (in a typically more vulnerable region for delamination or loading damage) prior to the application of foam thereto. These are but three such arrangements, it being understood that still other arrangements of full hook tape, various subsections of hook material (in rectangles, squares, triangles, etc.) may be randomly or purposefully placed about in an orderly pattern prior to "foaming". To a lesser degree, the looped "partner" to such hook sections may be situated about, in place of (i.e., in the alternative) OR in addition to the placement of the hook section tapes there along . . . prior to the addition of foam to these reefer wall units.

Main steps to this invention include:
1) Replacing standard scrim by laminating a PET backing that has a polypropylene film layer on one side and urethane surface on the other side.
2) The urethane surface would face the foam and provide a chemical bond to the urethane foam.
3) Then we would place strategically half of an adhesive backed Velcro® or the "Vel" if you will (i.e., just the male or hook portions of such material) along various points of the wall for better adhesion of foam to these sections of strategically placed Velcro tape halves.

Advantages are that this alternative to the use of full loop sheet material (the subject of its own pending U.S. application, also filed in the name of Applicant) is much cheaper than the aforementioned. These subsections of hook-only strips (or shaped sections) can also be placed on any time after the panel has been laminated thus allowing for a strategic yet inexpensive way to get the foam bond without laminating.

The use of hook tape and/or shaped sections per this invention also avoids the potential for "looped only" material assists getting buried into the surface like the loop fabric might during lamination. The materials being used hereby only use adhesives per se and do not HAVE TO BE laminated into the surface of the panel in order to bond to it.

Configurations, shapes and angles of VEL are only limited by the requirement of the application. Furthermore, it should be understood that this invention can be practiced on whole wall or just on the bottom sections thereof. There should be no distinction other than the concept of why we are doing this. It should be cheaper than but still just as effective as loop.

Still other advantages of this improved product include:
1) a fiber loop design that has been woven into a pattern extending far beyond the surface of the panel. That allows for the foam to cure around the loops to the bottom connection point and create a much deeper "grab factor". That, in turn, allows for the wall to exceed the surface bond obtained by the current methods of scrim and create a more permanent bond, deep into the cured foam, for solving the delamination issue of prior products.

This is truly a game-changing, MAJOR improvement! When the foam attaches to the wall, the raised "loop" fibers of this invention will grab and hold much better than just an X and Y axis product. The present invention adds a looped dimension to the equation thus making for an overall stronger interior panel. Even if the standard scrim was lofted or roughed up to provide an exposed Z-fiber, as per accompanying FIG. 6, there is still no loop mechanism equivalent that can provide the mechanical grab and reconnection to an interwoven base/bottom that this concept does.

2) The design of the new "loop" has a uniform grid base (loop density can be varied to accommodate different foam compositions and densities) that allows for excellent attachment to applicant's base polypropylene wall and glass mat products so that it holds better.

3) The "loop" design is impervious to moisture unlike old scrim material that can separate when wet into two point bond layers from its point bond.

4) Applicant's polypropylene can soak through this product during the lamination process thereby allowing for a better grab to the trailer interior GRTP wall than the traditional scrim product, a potentially 50%, 75%, even 100% or more adhesion than standard scrim, in fact.

5) Loop fabric can be applied by either laminating on OR gluing to the backside surface of the wall allowing for maximum optional usages in the field.

6) Loop fabric can be of any material such as a polyester, nylon, polypropylene, polyethylene, etc., but should be stiff enough to hold its shape without flattening out as the trailer wall is rolled for shipping or placed into a foaming chamber.

One set of preferred method steps for making this improved material product commences with: (a) providing an improved fabric backing substrate having a plurality of loops interwoven therewith; (b) orienting the plurality of loops in the backing substrate to "stand" in a raised (rather than flattened) condition; and (c) injecting a polymer (preferably, polypropylene) foam about the raised loops for greater impregnation of the polymer into the backing substrate for the manufacture of a trailer scrim/glass-reinforced thermoplastic interior wall panel.

A further novel method entails making an improved storage unit, such as a refrigerated trailer, railcar, shipping container and/or box truck using a plurality of such glass-reinforced thermoplastic interior wall panels. That unit will exhibit greater foam adhesion within said interior wall panels, resulting in less potential damage from container packers and/or during packaging transport. And, due to this increased foam adhesion, such units will have reduced repair/replacement costs and a prolonged useful life.

Applicant believes his improvement fully exploits the revolutionary "loop" fabric that his method employs. That looped design is not the same typical Velcro® underlayment nor even one half of what makes up standard Velcro tape, i.e. the hook OR the partnering loop side. The latter's loops are much smaller and merely intended to coordinate (i.e. mesh) with the hooks of the other material half It would not be possible, nor practical, to incorporate a full or half portion of typical Velcro® tape for achieving the desired adhesion levels observed with the present invention.

The aforementioned loops may be standard/uniform or continuous in relative height to the interwoven base as per FIG. 7A. Alternately, another embodiment would address improvements using loops of variable heights, such as the short, medium and tall loop heights 118*a*, 118*b* and 118*c* for product 110 in accompanying FIG. 7B.

This invention improves the performance of reinforced and non-reinforced panels used for interiors of refrigerated transportation equipment. Admittedly, surface treatments are used all the time for improving adhesion with glues, etc., but this new dimensional "loop" is truly novel in its unique improvements in this field of use.

Two representative sizes of fully looped materials, made for Applicant by Apex Mills, were manufactured for size comparison purposes. The first was designated RH87 loop material (as seen below):

| STYLE CONTENT: | RH87 | TEST METHOD |
|---|---|---|
| 100% POLYESTER | | ASTM D629 |
| WEIGHT (oz/sq yd): | 5.3 +/− 10% | ASTM D3776 |

-continued

| STYLE CONTENT: | RH87 | TEST METHOD |
|---|---|---|
| WALES (width)/inch: | 9 +/− 1 | ASTM D3887 |
| COURSES (length)/inch: | 27 +/− 3 | ASTM D3887 |
| INSTRON BALL BURST (lbf): | MIN 75 | ASTM D3787 |
| MULLEN BURST: | N/A | ASTM D3786 |
| THICKNESS (inch): | 0.18 +/− 0.02 | ASTM D1777 |
| TENSILE (LENGTH) | N/A | ASTM D5034 |
| (WIDTH) | N/A | ASTM D5034 |
| AT BASE | 117 Loops/sq inch +/− 12 Loops Loop height: 6 mm +/− 0.6 mm Loop height: 4 mm +/− 0.4 mm | |

For a smaller, more compact style of fabric backing, a second scale of substrate was made and tested. Called RJ30, its particulars are as follows:

| STYLE CONTENT: | RJ30 | TEST METHOD |
|---|---|---|
| 100% POLYESTER | | ASTM D629 |
| WEIGHT (oz/sq yd): | 4.3 +/− 10% | ASTM D3776 |
| WALES (width)/inch: | 9 +/− 1 | ASTM D3887 |
| COURSES (length)/inch: | 27 +/− 3 | ASTM D3887 |
| INSTRON BALL BURST (lbf): | MIN 75 | ASTM D3787 |
| MULLEN BURST: | N/A | ASTM D3786 |
| THICKNESS (inch): | 0.11 +/− 0.011 | ASTM D1777 |
| TENSILE (LENGTH) | N/A | ASTM D5034 |
| (WIDTH) | N/A | ASTM D5034 |
| AT BASE | 63 Loops/sq inch +/− 6.5 Loops Loop height: 5 mm +/− 0.5 mm Loop height: 3 mm +/− 0.3 mm | |

RH87 and RJ30 are both warp knitted fabrics utilizing a unique construction where 2 multifilament yarn systems form the substrate and a $3^{rd}$ heavy gauge monofilament yarn system is anchored on 1 needle and cast off on the alternate needle to form a loop on one side of the fabric while leaving the alternate side of the fabric smooth. Both RJ30 and RH87 are made with 100% Polyester but other yarn types can be substituted therefor.

Figure 3:
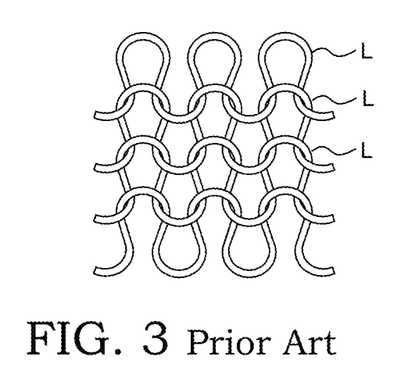
FIG. 3 is a diagrammatic representation of one prior art variety of multiple thread/strand fabric inter-looped to one another but with no base connection, per FIG. 3a of U.S. Pat. No. 3,934,064.
Figure 4:
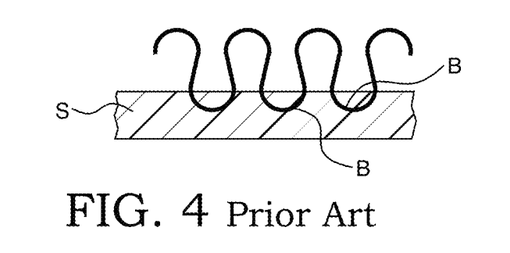
FIG. 4 is a diagrammatic representation of a second prior art foam backing system, this time with a single thread/strand having one end into a polymer base but no interweaving therethrough, per FIG. 7 of U.S. Pat. No. 3,934,064.
Figure 5:
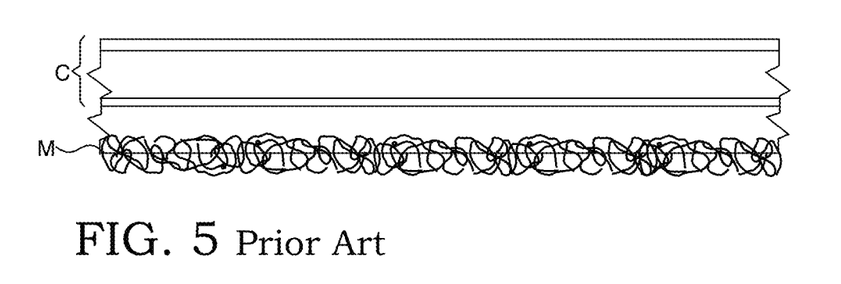
FIG. 5 is a cross-sectional diagram of a third prior art variety of material showing means for randomly embedding continuous strands of fabric into and at least partially below an innermost layer; but it exhibits no connection on randomness, per FIG. 8A of U.S. Published Application No. 20150246511.
Figure 6:
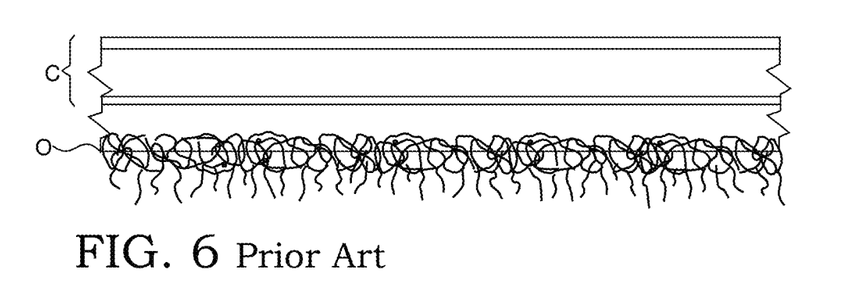
FIG. 6 is a cross-sectional diagram of a fourth prior art variety of material showing embedding strands of fabric with multiple downward extensions (in one common direction) from its innermost layer, per FIG. 8B of U.S. Published Application No. 20150246511.

FIGS. 3 through 6 show other relevant material modifications prior to the parent application AND the present invention. FIG. 3 shows looped layers L onto one another in a typical fabric material. FIG. 4 shows a prior art substrate S from which a single strand of line is embedded from only the adjoining base elements B. FIG. 5 shows a prior art scrim section with its non-woven mat M beneath composite sheet C, similar to the main disclosure of Applicant's U.S. Pat. No. 6,743,742. And FIG. 6 is a modified variation of FIG. 5 with an intentionally roughed up outer fibrous layer O which still does not achieve the bond adhesion levels observed with the present invention.

FIGS. 7 and 7A show one preferred embodiment of interior wall panel 10 made according to the parent invention. The exterior, metal wall to that panel is indicated with a TM designation and its innermost wall panel interior with a TI designation.

Said wall panel 10 has a base material 12, into which is sewn a special looped fabric backing, generally 14, consisting of an underlying substrate layer 16 from which a plurality of polymer loops 18 are interwoven and outwardly extend. The latter loops are encased in an outer foam layer 20 for subsequent lamination to form the wall panel proper. Such loops are necessary and critical for integration into the base for making an improved GRTP product hereby.

FIG. 7B shows an alternate embodiment of wall panel 110, with its own fabric backing 114, and corresponding substrate layer 116 from which three representative heights of variably sized loops, 118a, 118b and 118c are interwoven, and then combed or brushed upward to "stand at attention" prior to being foamed about.

Figure 7C:
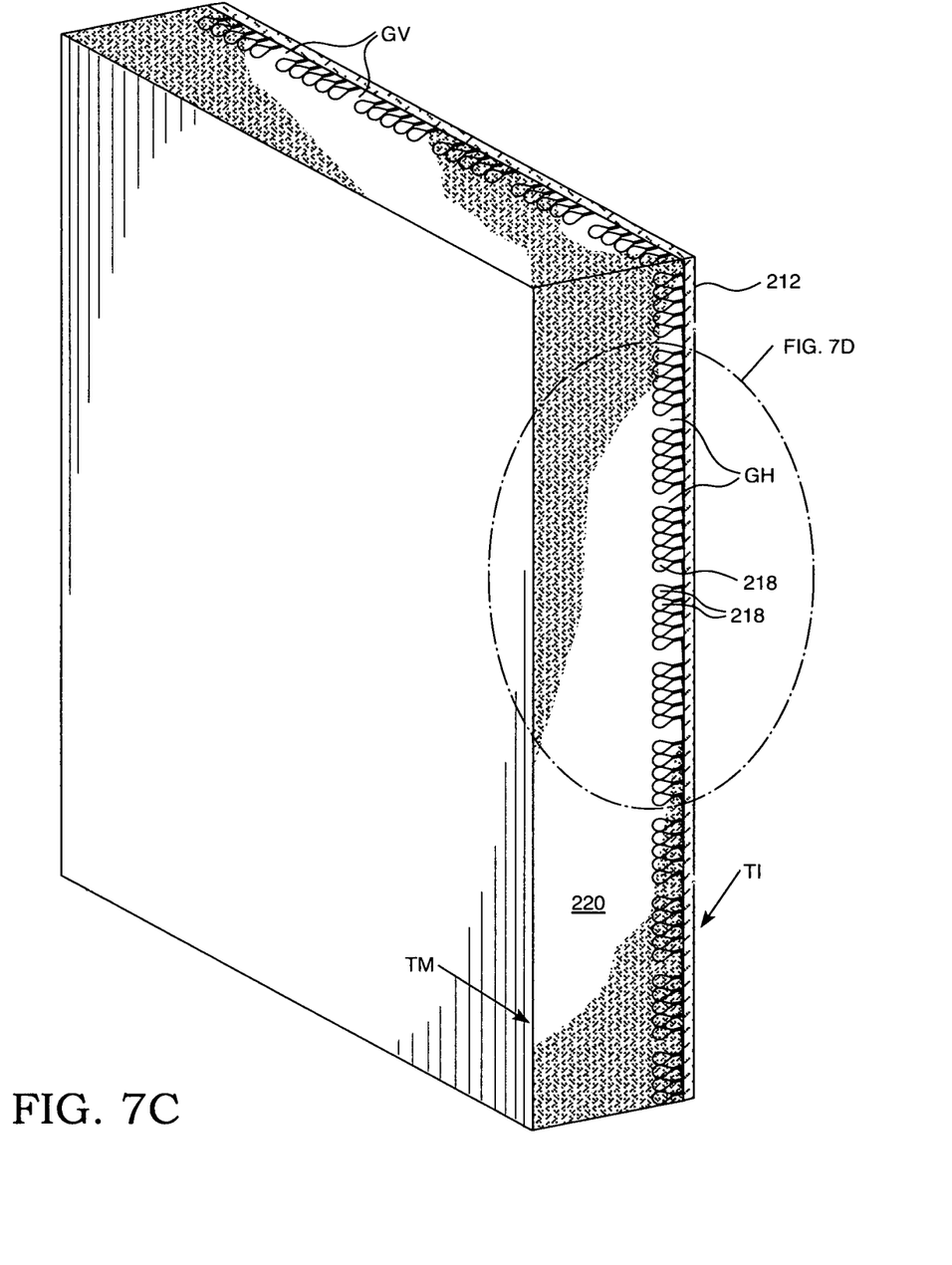
FIG. 7C is a top perspective view of a second alternative embodiment showing intentional loop gaps in both the horizontal GH and vertical GV directions.
Figure 7D:
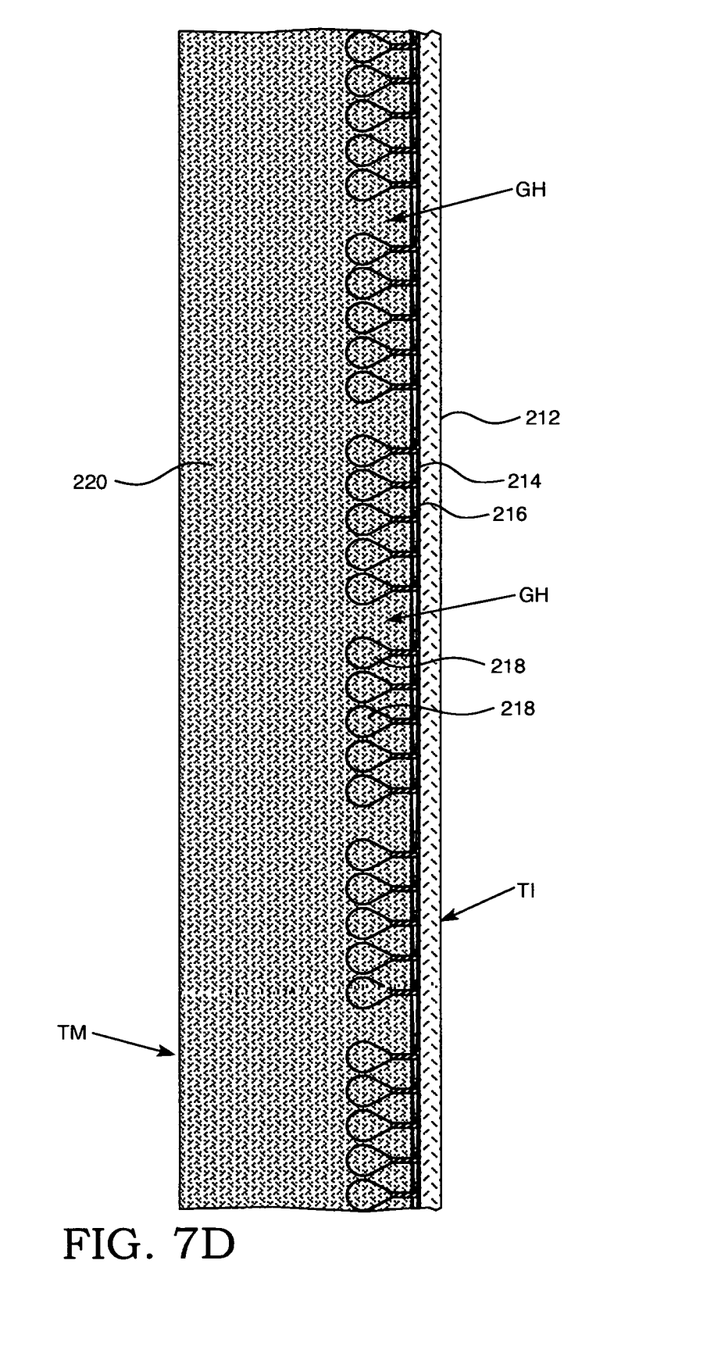
FIG. 7D is a close-up sectional view of the circled area 7D from FIG. 7C.

FIGS. 7C and D show a second alternate embodiment of wall panel 210, with its own fabric backing 214, and corresponding substrate layer 216 from which one representative height of loop 218 is interwoven but with purposeful loop gaps added (either randomly as shown, or in a preset pattern) in the horizontal direction GH, vertical direction GV or both.

Figure 8:
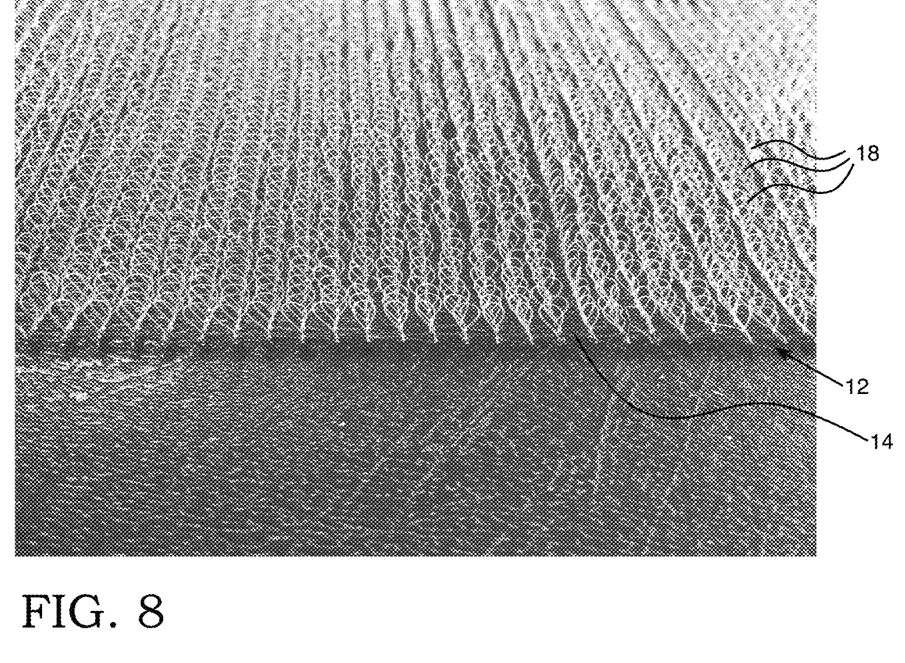
FIG. 8 is a top perspective photograph showing, from one edge, an embodiment of loop scrim fabric backing per this invention.

FIG. 8 is a photograph depicting a forward edge to a representative section of the base material from FIGS. 7 and 7A with its rows of interwoven fabric backing attached thereto and its plurality of consistently-sized loops 18 extending upwardly therefrom . . . all before encasement in the foam to make the improved interior wall panel of the parent invention.

Figure 9:
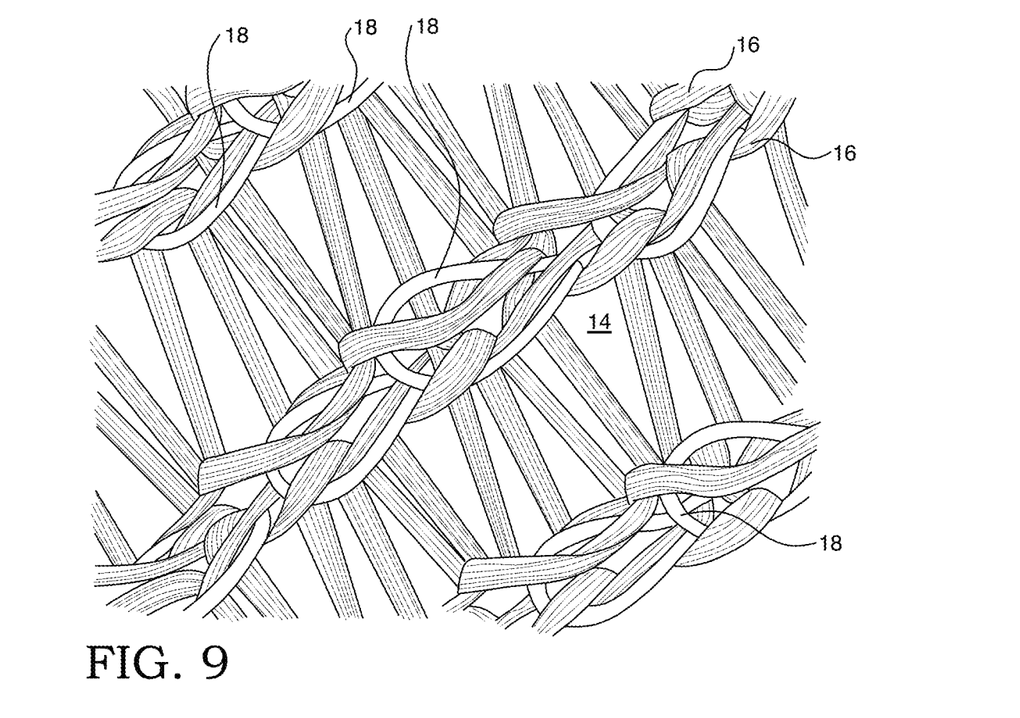
FIG. 9 is a close-up diagram showing or how the loops are interwoven into the base per one embodiment of this invention.

FIG. 9 shows an underside of substrate layer 16 (lined) from which the respective rows of loops 18 (unlined, for better illustration) are interwoven. Note how all of the loops tie into the base or weave of substrate layer 16. That base is necessary for embedding into the laminate product: the base sticks to the trailer backing interior TI while the loops of that product "stick" firmly into the foam injected between the interior TI and metal exterior TM.

Figure 10:
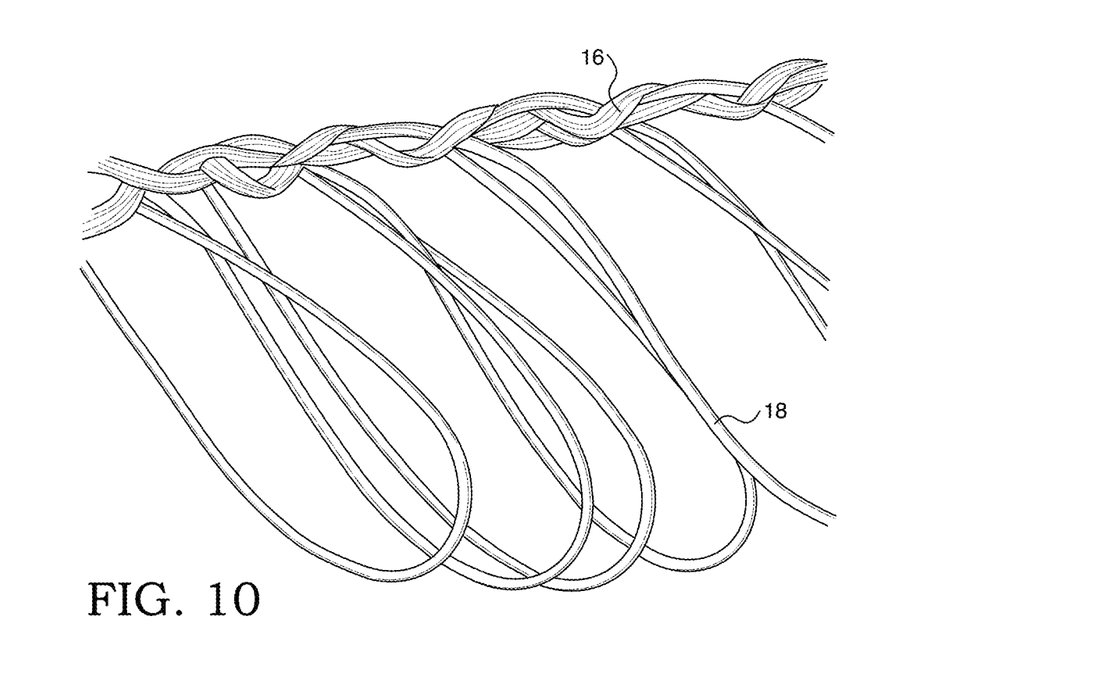
FIG. 10 is a close-up diagram focusing on one row of preferred loops with base material per this invention.

FIG. 10 shows a close up view of one representative row of loops 18 with a single braid of the substrate layer 16 wrapped thereabout consistently lined like the two components in preceding FIG. 9.

Figure 11:
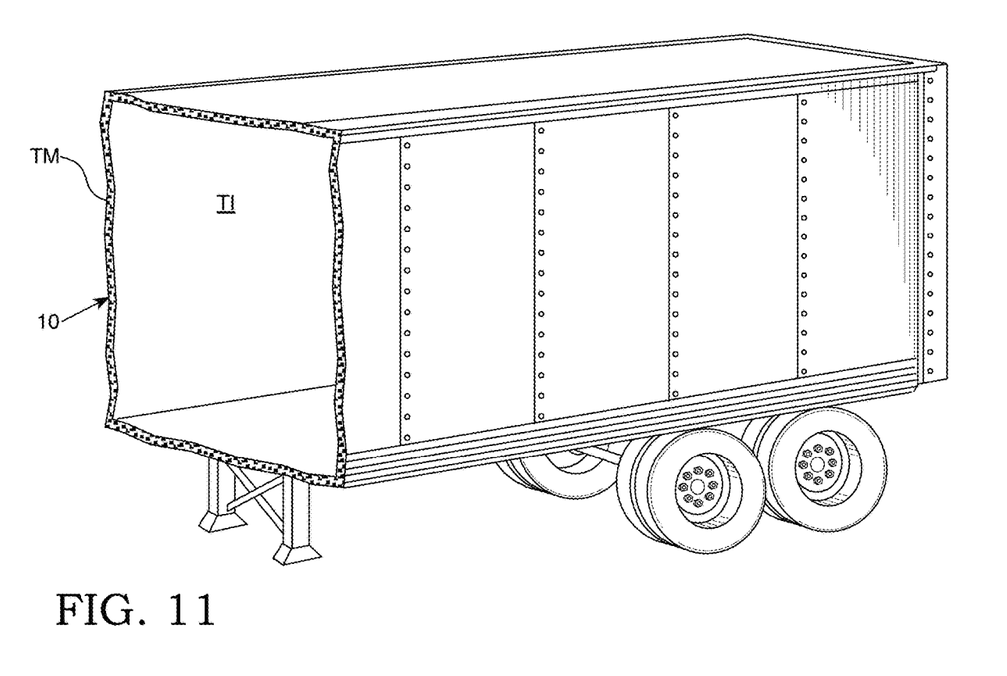
FIG. 11 is a perspective, sectional view of a refrigerated vehicle trailer showing the improved loop scrim fabric backing of this invention installed on the interior of the same.

Finally, FIG. 11 is a representative trailer product with an exterior metal TM surface, showing in cutaway to expose one of its interior walls TI made using the panel improvements 10 of this AND the parent invention.

Having described the presently preferred embodiments, it is to be understood that this invention may otherwise be covered by the scope of the provisionally filed claims that follow.

What is claimed is:

1. A reefer wall panel with improved foam adhesion from having either a plurality of hook and loop tape strips, a plurality of shaped hook and loop tape sections or both a plurality of hook and loop tape strips and a plurality of shaped hook and loop tape sections adhered to the wall panel prior to an application of foam to the wall panel with the plurality of hook and loop tape strips, the plurality of shaped hook and loop tape sections or both the plurality of hook and loop tape strips and the plurality of shaped hook and loop tape sections.

2. The reefer wall panel of claim 1 wherein a plurality of hook sides to the plurality of hook and loop tape strips are adhered to the wall panel prior to the application of foam to the wall panel.

3. The reefer wall panel of claim 2 wherein the plurality of hook sides to the plurality of hook and loop tape strips are applied substantially horizontally to the wall panel prior to the application of foam to the wall panel.

4. The reefer wall panel of claim 3 wherein the plurality of hook sides to the plurality of hook and loop tape strips extend from a top to a bottom of the wall panel prior to the application of foam to the wall panel.

5. The reefer wall panel of claim 3 wherein the plurality of hook sides to the plurality of hook and loop tape strips extend from left to right along a whole section of the wall panel prior to the application of foam to the wall panel.

6. The reefer wall panel of claim 2 wherein the plurality of hook sides to the plurality of hook and loop tape strips are applied diagonally to the wall panel prior to the application of foam to the wall panel.

7. The reefer wall panel of claim 1 wherein the plurality of shaped hook and loop tape sections are applied randomly to the wall panel prior to the application of foam to the wall panel.

8. The reefer wall panel of claim 1 wherein the plurality of shaped hook and loop tape sections are applied to a lower half of the wall panel.

9. The reefer, wall panel of claim 1 wherein the plurality of shaped hook and loop tape sections are substantially circular.

10. The reefer wall panel of claim 1, which further includes loop sides to the plurality of hook and loop tape strips adhered to the wall panel prior to the application of foam to the wall panel.

* * * * *